(12) United States Patent
Bauer et al.

(10) Patent No.: US 9,862,338 B2
(45) Date of Patent: Jan. 9, 2018

(54) SYSTEM FOR CONTACTLESS ENERGY TRANSFER, USE OF A SYSTEM FOR CONTACTLESS ENERGY TRANSFER AND VEHICLE WITH A SYSTEM FOR CONTACTLESS ENERGY TRANSFER BETWEEN A FIRST VEHICLE COMPONENT AND A SECOND VEHICLE COMPONENT

(71) Applicant: Airbus Operations GmbH, Hamburg (DE)

(72) Inventors: Hans-Achim Bauer, Hamburg (DE); Andre Zybala, Hanstedt (DE); Christian Rathge, Irxleben (DE)

(73) Assignee: Airbus Operations GmbH (DE)

( * ) Notice: Subject to any disclaimer, the term of this patent is extended or adjusted under 35 U.S.C. 154(b) by 688 days.

(21) Appl. No.: 13/921,767

(22) Filed: Jun. 19, 2013

(65) Prior Publication Data

US 2013/0278053 A1    Oct. 24, 2013

Related U.S. Application Data

(63) Continuation of application No. PCT/EP2011/073607, filed on Dec. 21, 2011.

(30) Foreign Application Priority Data

Dec. 22, 2010    (DE) .................. 10 2010 055 696

(51) Int. Cl.
*H02J 4/00*    (2006.01)
*B60R 16/03*    (2006.01)
(Continued)

(52) U.S. Cl.
CPC .......... *B60R 16/03* (2013.01); *B64D 11/0624* (2014.12); *H01F 38/14* (2013.01);
(Continued)

(58) Field of Classification Search
None
See application file for complete search history.

(56) References Cited

U.S. PATENT DOCUMENTS

| 5,396,251 A | 3/1995 | Schuermann |
| 5,491,484 A | 2/1996 | Schuermann |

(Continued)

FOREIGN PATENT DOCUMENTS

| CN | 1360687 | 7/2002 |
| CN | 101911029 A | 12/2010 |

(Continued)

OTHER PUBLICATIONS

Chinese Office Action for Applicaiton No. 201180062146.3 dated Nov. 27, 2014.

(Continued)

*Primary Examiner* — Jared Fureman
*Assistant Examiner* — Joel Barnett
(74) *Attorney, Agent, or Firm* — Lerner, David, Littenberg, Krumholz & Mentlik, LLP

(57) ABSTRACT

A system for contactless energy transmission includes a transformer formed by a primary winding and a secondary winding, which transformer is designed so as to be resonant as a result of capacitors. By measuring and comparing electrical state variables on the primary side and on the secondary side the efficiency of the transmission of electrical power from the primary side to the secondary side is determined, and by varying the resonance frequency of the transformer or of the frequency of a primary voltage applied to the primary winding the resonance frequency and the primary voltage frequency are attuned to each other.

13 Claims, 6 Drawing Sheets

Related U.S. Application Data

(60) Provisional application No. 61/426,132, filed on Dec. 22, 2010.

(51) Int. Cl.

| | | |
|---|---|---|
| *H02J 5/00* | (2016.01) | |
| *H01F 38/14* | (2006.01) | |
| *H04B 5/00* | (2006.01) | |
| *B64D 11/06* | (2006.01) | |
| *H02J 7/02* | (2016.01) | |

(52) U.S. Cl.
CPC .............. *H02J 5/005* (2013.01); *H02J 7/025* (2013.01); *H04B 5/0037* (2013.01)

(56) References Cited

U.S. PATENT DOCUMENTS

| | | | | |
|---|---|---|---|---|
| 5,831,841 | A * | 11/1998 | Nishino | H02J 5/005 191/10 |
| 6,301,128 | B1 * | 10/2001 | Jang | H02J 5/005 363/127 |
| 6,825,620 | B2 | 11/2004 | Kuennen et al. | |
| 2002/0060918 | A1 | 5/2002 | Drobnik | |
| 2009/0127936 | A1 * | 5/2009 | Kamijo | H02J 7/025 307/104 |
| 2009/0127937 | A1 | 5/2009 | Widmer et al. | |
| 2009/0295223 | A1 | 12/2009 | Bauer et al. | |
| 2010/0033156 | A1 | 2/2010 | Abe et al. | |
| 2010/0066176 | A1 * | 3/2010 | Azancot | H02J 5/005 307/104 |
| 2010/0084918 | A1 * | 4/2010 | Fells | H02J 5/005 307/32 |
| 2010/0171461 | A1 * | 7/2010 | Baarman | H02J 5/005 320/108 |
| 2010/0174629 | A1 * | 7/2010 | Taylor | G06Q 20/10 705/34 |
| 2010/0244577 | A1 | 9/2010 | Shimokawa | |
| 2011/0115303 | A1 * | 5/2011 | Baarman | H02J 17/00 307/104 |

FOREIGN PATENT DOCUMENTS

| | | |
|---|---|---|
| DE | 4438287 C1 | 5/1996 |
| DE | 69323995 T2 | 9/1999 |
| DE | 10026173 A1 | 10/2001 |
| DE | 102008024217 A1 | 12/2009 |
| GB | 2321726 A | 8/1998 |

OTHER PUBLICATIONS

Chinese Office Action for Application No. 201180062146.3 dated Mar. 4, 2016.

* cited by examiner

SYSTEM FOR CONTACTLESS ENERGY TRANSFER, USE OF A SYSTEM FOR CONTACTLESS ENERGY TRANSFER AND VEHICLE WITH A SYSTEM FOR CONTACTLESS ENERGY TRANSFER BETWEEN A FIRST VEHICLE COMPONENT AND A SECOND VEHICLE COMPONENT

REFERENCE TO RELATED APPLICATIONS

The present application is a continuation of International Application No. PCT/EP2011/073607, filed Dec. 21, 2011, which claims the priority from German Patent Application No. 10 2010 055 696.3, filed Dec. 22, 2010, and which claims the benefit of the filing date of U.S. Provisional Patent Application No. 61/426,132, filed Dec. 22, 2010, the disclosures of which are hereby incorporated herein by reference.

TECHNICAL FIELD

The invention relates to a system for contactless energy transmission, to the use of a system for contactless energy transmission, and to a vehicle comprising a system for contactless energy transmission between a first vehicle component and a second vehicle component.

BACKGROUND OF THE INVENTION

As an alternative to a wire-bound connection between a voltage source and an electrical consumer, systems for contactless energy transmission for a host of technical fields are known, which systems are applied both in household appliances and in industrial plants. The use of such a system is advantageous in particular in those applications where physical, wire-bound, connections are undesirable or impractical or are associated with a potential danger.

From DE 102008024217 A1 and US 20090295223 A1 a system for contactless energy transmission and data transmission between two vehicle components is known, which system replaces classical cabling between passenger seats and an on-board voltage supply and an on-board data network or the like in a vehicle cabin. To this effect a transformer in the form of a pair of coils is used, which pair of coils comprises a primary winding, which can be connected to a voltage source, with a primary core, and comprises a secondary winding, which can be connected to an electrical consumer, with a secondary core. With the use of a modulator-demodulator device a data flow can be converted to an alternating voltage that comprises a significantly higher frequency than does a primary voltage to be applied to the primary winding. By modulating this higher-frequency voltage as harmonic oscillation onto the primary voltage and by subsequently demodulating this harmonic oscillation into the secondary winding the data flow in the consumer can be restored. Such a system allows flexible reconfigurability of a cabin of a vehicle, with the aforesaid manifesting itself, for example, in a modular seating concept with passenger seats that can be affixed at different positions, or relates to individually positionable "passenger service units (PSUs)", because, during integration of a number of primary windings in the cabin and secondary windings to the corresponding consumers, neither the devices in the passenger seats nor the PSUs need to be cabled any longer, and can quickly and flexibly be positioned in a variable manner.

BRIEF SUMMARY OF THE INVENTION

Already-known wireless inductive energy and data transmission systems can be designed in such a manner that the transformer with primary and secondary windings for the purpose of achieving a resonant oscillation behavior additionally comprises a capacitance. The most optimal possible transmission of electrical power by means of the transformer can be ensured when the primary voltage comprises a frequency that coincides with the resonance frequency of the transformer. Because of manufacturing tolerances, differently designed system structures and ageing effects, the resonance frequency of the transformer cannot, however, be adjusted with adequate accuracy or cannot be predetermined in each implementation of such a system, and consequently an optimum operating point may be found only by chance.

It would thus be expedient to create a system for wireless energy transmission, which system reduces or entirely eliminates the above-mentioned disadvantages. Thus as aspect of the invention proposes a system for wireless energy transmission, which system comprises particularly high transmission efficiency, reliability and a particularly long service life, while at the same time requiring the smallest possible manual effort to achieve this.

At this point it should be pointed out that the systems for contactless energy transmission proposed below can of course also be designed and used for the transmission of data. This takes place by means of the use, mentioned several times hereinafter, of modulator-demodulator devices that are described in detail in the above-mentioned documents DE 102008024217 A1 and US 20090295223 A1.

One embodiment of the invention involves a resonant transformer with a primary winding in a primary core, a secondary winding in a secondary core that is mechanically not connected to the primary core, and at least one capacitor. By linking an inductance in the form of a primary winding and/or secondary winding with a capacitance in the form of a capacitor, an oscillating circuit with a resonance frequency that is decisively determined by the inductance and the capacitance is created. Preferably, the primary winding could be connected to a primary capacitor, and the secondary winding to a secondary capacitor.

The primary winding and the secondary winding can form various arrangements with any capacitors that may be associated with them. A primary circuit comprising a primary winding in a primary core and a primary capacitor could, for example, be based on a series connection comprising a primary winding and a primary capacitor, as an alternative to this also on a parallel connection. On the other hand, a secondary circuit comprising a secondary winding in a secondary core and a secondary capacitor can also be based on a series connection or parallel connection, and consequently a total of four different forms of linking for a transformer with two capacitors can result. Taking into account various marginal conditions, for example the losses occurring at different frequencies, the possible compactness of the components, and the arrangement of a capacitor directly on an associated winding or externally in a control unit connected to it, in each case the most suitable type of interconnection can be selected. The invention is neither limited to a particular type of interconnection, nor to the location of one or several capacitors with regard to an associated winding.

Transmission of electrical energy takes place by generating an electromagnetic field by means of the primary winding by applying a primary voltage in the form of an alternating voltage and the associated induction of a voltage into the secondary winding. As a result of this an electrical power is transmitted. The primary winding could, for example, be arranged in the form of encapsulated primary elements within a floor of a cabin or a ceiling lining or the like of a vehicle in order to, with corresponding secondary elements, depending on the desired modification of the cabin, make it possible to provide wireless energy transmission to passenger seats and/or PSUs.

The system according to an embodiment of the invention further comprises a primary control unit, a secondary control unit and a measuring device that is connected to the secondary winding and to the secondary control unit for acquiring an electrical state variable in the secondary winding. The primary control unit can be arranged at a distance from the respective primary element and to save components of the system according to an embodiment of the invention could control a number of primary elements. The secondary control unit is preferably arranged in or directly on a consumer that is supplied with electrical energy by way of the transformer formed by way of the primary winding and secondary winding.

The measuring device could, for example, be designed in the form of a voltage and/or current measuring device that can measure the voltage induced into the secondary winding or the current intensity resulting therefrom and caused by the user, and can transmit the above, for example, to a dedicated measuring input of the secondary control unit.

For the transmission of data between the secondary control unit and the primary control unit the system according to an embodiment of the invention comprises a modulator-demodulator device. For connection to a modulator-demodulator device each, the primary control unit and the secondary control unit can each comprise a data interface. As an alternative to this, a modulator-demodulator device can also be integrated directly in the respective primary control unit or secondary control unit.

According to an embodiment of the invention an alternating voltage is applied to the primary winding, which alternating voltage results in the induction of an alternating voltage in the secondary winding. In order to apply an alternating voltage to the primary winding, a primary inverter with a variable frequency is provided. This primary inverter can, for example, generate an alternating voltage from an incoming direct voltage. The frequency of the voltage to be applied to the primary winding can be adjusted to the resonance frequency of the transformer in order to in this way achieve particularly effective transmission of electrical power from the primary winding to the secondary winding and in so doing achieve comparatively low losses.

Furthermore, the primary control unit is connected in a controlling manner to the primary inverter, for example by way of the combination of a control output on the primary control unit and of a control input on the primary inverter. The primary control unit is designed to change the frequency of the primary inverter when it receives a frequency change signal. In this arrangement the frequency change signal can be transmitted, by the secondary control unit, with the use of the modulator-demodulator device depending on the change in the electrical state variable, to the primary control unit.

It is thus an aspect of the invention, with simultaneous variation of the frequency of the primary voltage present on the primary winding, and measuring the electrical state variable on the secondary side, to find an optimal operating point in which the lowest losses are achieved and in which the resonance frequency of the transformer and the frequency of the primary voltage agree. The frequency of the primary voltage could, for example, be run through from a predetermined minimum frequency to a predetermined maximum frequency so that the physically present resonance frequency of the transformer, which resonance frequency is subject to tolerances, is reliably covered, which in close proximity to the aforesaid could manifest itself for example by a higher voltage and higher current intensity on the secondary side. Frequencies of the primary voltage that are further removed from the resonance frequency can be detected by higher losses of the power that can be taken from the secondary winding. This provides the basis for finding an operating point of maximum efficiency for the transmission of an alternating voltage from the primary side and the secondary side.

This can be used in a particularly advantageous manner for the application of an iterative method in which the frequency of the primary voltage provided by the primary inverter is changed step-by-step or incrementally. At each of these incremental changes an electrical state variable can be determined on the secondary winding, which state variable comprises, for example, the induced voltage. By means of a comparison of all the determined voltage values for a series of incremental changes on the primary side, the operating point can be determined or, depending on the number of the tolerated iterative steps, interpolated, at which operating point the largest-possible induced voltage on the secondary side is present. After running through a series of incremental changes between a theoretically possible minimum operating frequency and a theoretically possible maximum operating frequency, this operating point can be retained in the secondary control unit for further operation of the transformer.

Preferably, the frequency change signal sent by the secondary control unit to the primary control unit in each case comprises a concrete value relating to the requested frequency of the primary inverter. As a result of this a direct connection between the frequency of the primary voltage and the electrical state variable on the secondary winding can be created.

According to an advantageous embodiment of the invention, the primary inverter comprises a frequency generator and is designed to generate an alternating voltage with a waveform that follows a waveform generated by the frequency generator. This makes possible the use of a frequency generator for controlling the inverter, wherein the electrical power consumption of said frequency generator is significantly lower than the power consumption of the inverter, for example being only a few milliwatts. Consequently, the construction of the inverter can be very economical, despite the inverter's great flexibility. In this case the primary control unit could be designed to control the frequency generator directly by way of a control output. The frequency generator can, furthermore, also be an integrated component of the primary inverter, or can be designed as an external component that is connected to the primary inverter.

An advantageous embodiment of the invention further comprises a coupling device that is designed to individually connect several primary inverters selectively to a part of a group of primary windings. This provides a decisive advantage in that it is not necessary to provide a primary inverter with an adjustable frequency for each existing primary winding, for example in a cabin of a vehicle, but instead it is possible to select a maximum, predetermined by the number of passenger seats or the like, of primary windings that are concurrently active, by selectively connecting the individual primary inverters to primary windings predetermined by the passenger seat arrangement. Furthermore, in this case a primary control unit can preferably be connected in a controlling manner to several primary inverters in order to combine the advantages of grouping just a few primary inverters with a reduction in the number of primary control units.

Preferably, the coupling device is designed to subject all the available primary windings over a predetermined duration to an alternating voltage and to measure the resulting current intensity in the respective primary windings. This could take place selectively, either consecutively or in groups. This makes it possible for the coupling device to determine the primary windings where there are adjacent secondary windings to form a transformer. In this way the coupling device knows which connections to establish and can automatically make the correct electrical connections between the primary windings and the primary inverters.

An advantageous embodiment of the invention comprises a primary measuring device for determining an electrical state variable present at the primary winding. As a result of this several advantages could be gained. Firstly, it would be possible for a primary control unit, by purely measuring the current intensity present in the primary winding, to determine the presence of a transformer with a secondary winding, as mentioned above.

Secondly, it would consequently also be possible, by way of the primary control unit and utilization of the measured electrical state variables, to compare the electrical oscillation behavior of the primary winding with a reference oscillation behavior. In this way, too, it could be determined whether the primary winding forms a transformer with a secondary winding, thus comprising a significantly different resonance frequency than does a primary winding on its own. Preferably, this could be carried out with the use of several different frequencies of the voltage applied to the primary winding. With a suitable geometric design of the primary core or of the primary winding and of the secondary core, or of the secondary winding, by means of such a method it would also be possible to carry out position determination of the secondary winding relative to the primary winding. By means of such detection methods the consumption of electrical power could be reduced in that any primary windings that are not used, which do not form part of a transformer, are switched off.

Furthermore, to improve the analysis of the electrical state variables determined on the secondary winding, the electrical state variables present at the primary winding are transmitted, with the use of the modulator-demodulator device, to the secondary control unit so that a direct comparison of the transmitted electrical power with the electrical power consumed by the primary winding can take place.

An advantageous embodiment of the invention comprises a secondary inverter that is connected to the secondary winding and that is designed to provide a voltage of a predetermined frequency to electrical consumers. As a result of this, independently of the frequency of the primary voltage an alternating voltage that is suitable for operating normal electrical consumers can be provided.

An advantageous embodiment of the invention comprises a primary rectifier that is arranged upstream of the primary inverter. As a result of this, prior to operating a primary inverter a direct current that is as homogeneous as possible, with characteristics that can be determined with sufficient accuracy, can be provided as a basis for homogeneous provision of an alternating voltage.

In an advantageous embodiment of the invention the primary measuring device is connected to the primary rectifier, which makes sense in particular in the case of accommodating the primary control unit and the primary measuring device so that they are remote from the primary element.

In an advantageous embodiment of the invention the primary control unit is designed to transmit the value of the determined electrical state variable to the secondary control unit. As a result of this, in the secondary control unit there is not only knowledge of the voltage and current intensity that can be provided by the secondary winding, but also knowledge of the values of the state variables originally fed to the transformer. As a result of this, the transmission loss can be calculated as a measure for finding the ideal operating point.

Another aspect of the invention includes a resonant transformer with a primary winding in a primary core, a secondary winding in a secondary core that is not mechanically connected to the primary core, and at least one capacitor with variable capacitance. The system according to an embodiment of the invention further comprises a secondary control unit that is connected to the capacitor in a controlling manner, and a secondary measuring device that is connected to the secondary winding and to the secondary control unit for acquiring an electrical state variable in the secondary winding.

In a manner that differs from the above approach, in this embodiment the secondary control unit is designed to change the capacitance of the capacitor, depending on the change in the electrical state variable.

The secondary control unit could be connected in a controlling manner with the capacitor, for example by a combination of a control output on the secondary control unit and a control input on said capacitor. With the application of a voltage of a predetermined value to the control output the capacitance of the capacitor and thus the resulting resonance frequency of the transformer can be set.

The primary winding of the system according to an embodiment of the invention of this variant is connected to a primary voltage source that is designed to provide an alternating voltage to the primary winding. This primary voltage source preferably provides an alternating voltage of a fixed frequency. However, this is not mandatory.

Adjustment of the frequency of the primary voltage and of the resonance frequency thus takes place conversely to the solution presented above. This means that in the case of a frequency predetermined in a fixed manner in relation to a series of primary elements only the secondary circuits with the secondary windings and the adjustable capacitor need to be calibrated. This saves a certain effort in the provision of a series of individually operable inverters for a multitude of primary elements and various frequencies, because all the primary windings can be subjected to the identical alternating voltage.

In an advantageous embodiment of the invention, for finding an optimum operating point it is also possible to use an iterative method in which the voltage-dependent capacitance of the capacitor is varied from a predetermined minimum value to a predetermined maximum value, wherein during the transition between various capacitance values the voltage present at the secondary winding and the current caused by the consumer could be registered by the measuring device. With a corresponding selection of the adjustable capacitor the resonance frequency of the transformer can cover the frequency of the primary voltage.

In the case of alignment of a secondary winding with a primary winding, even in an unfavorable relation between the frequency of the primary voltage and the resonance frequency of the transformer, electrical power can be transmitted which in spite of possible higher losses nonetheless would suffice at least for calibrating the resonance frequency.

Yet another aspect of the invention includes an iterative method that comprises the steps indicated above in the context of the system according to an embodiment of the invention taken together as follows: applying a primary voltage from a primary inverter with a frequency to a primary winding; acquiring a state point in a secondary winding, into which from the primary winding a voltage is induced, by acquiring electrical state variables. Subsequent analyzing of the state point for iterative optimization, and in the case of a deviation from an optimum operating point, transmitting a signal to a primary control unit connected to the primary winding and the primary inverter, in order to change the frequency of the applied primary voltage. Changing the frequency of the primary voltage by means of the primary control unit.

In an alternative method according to another aspect of the invention a constant frequency of the primary voltage is used. The iterative method comprises the steps of determining electrical state variables, iteratively and incrementally/step-by-step respectively, changing of the resonance frequency of the transformer formed by the primary winding and the secondary winding by adjusting a capacitor connected to the transformer, and analyzing the determined state point.

Furthermore, yet another aspect of the invention includes a vehicle comprising a first vehicle component that is affixed to the vehicle, and a second vehicle component that is movable relative to the first vehicle component that is affixed to the vehicle, wherein the first vehicle component comprises at least one primary element, and the second vehicle component comprises a secondary element.

BRIEF DESCRIPTION OF THE DRAWINGS

Further characteristics, advantages and application options of the present invention are disclosed in the following description of the exemplary embodiments and of the figures. All the described and/or illustrated characteristics per se and in any combination form the subject of the invention, even irrespective of their composition in the individual claims or their interrelationships. Furthermore, identical or similar components in the figures have the same reference characters.

DETAILED DESCRIPTION

Figure 1:
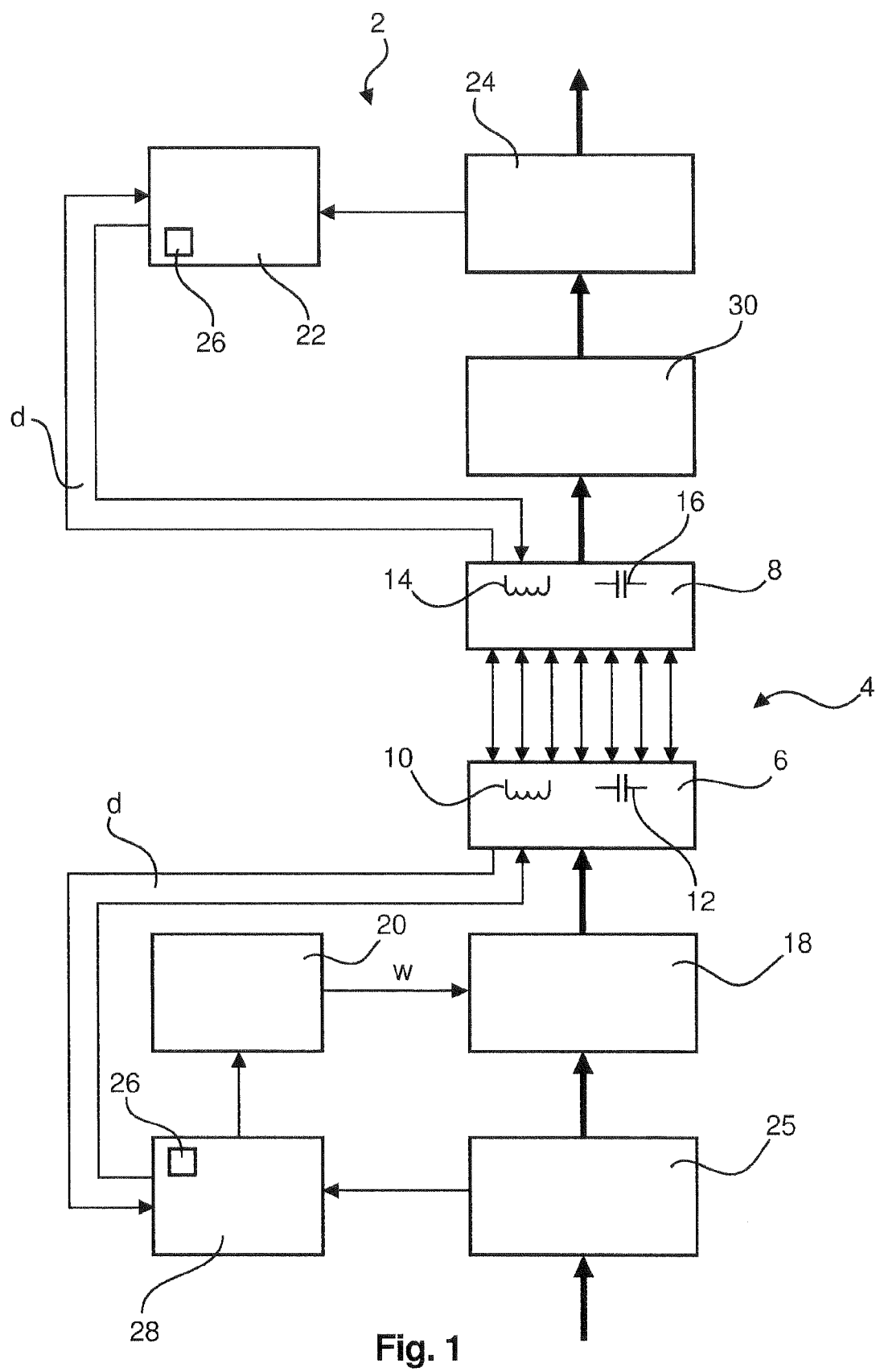
FIG. 1 shows a diagrammatic view of a system according to an embodiment of the invention.

FIG. 1 shows an exemplary embodiment of a system 2 according to an embodiment of the invention, whose centerpiece forms a transformer 4 with a primary element 6 and a secondary element 8, which elements are formed from a primary winding 10 in a primary core, and a secondary winding 14 in a secondary core that is mechanically not connected to the primary core. The primary winding 10 is connected in a series connection or a parallel connection to a primary capacitor 12, likewise the secondary winding 14 is connected to a secondary capacitor 16 in a series connection or a parallel connection. It is not mandatory for the capacitors 12 and 16 to be arranged directly on the windings 10 and 14; it is also imaginable to connect them away from the windings 10 and 14 by way of a corresponding electrical line. It could, for example, be advantageous to bring the primary capacitor 12 directly to the primary winding 10, while the secondary capacitor 16 could be arranged away from the secondary winding 14.

By equipping a primary element 6 and a secondary element 8 in such a way in the form of the transformer 4 with one or several capacitors, a resonant element is created that allows effective induction of an alternating voltage into the secondary winding 14 of the secondary element 8, in particular if an alternating voltage present at the primary winding 10 of the primary element 6 matches the resonance frequency that is significantly determined by the inductance of the windings 10 and 14 and the capacitance of the capacitors 12 and 16 of the transformer 4. Due to various cable lengths, component tolerances, component ageing and other factors that cannot be precisely predetermined in theory, the resonance frequency is always subject to a certain tolerance. Optimum calibration of an alternating voltage that is fed to the primary winding 10 is automatically carried out by the system 2 according to an embodiment of the invention.

This is achieved with the use of a primary inverter 18 which is preferably designed as a voltage-controlled inverter and comprises, or is connected to, a frequency generator 20. The frequency generator 20 is designed to feed a waveform w to the primary inverter 18, with the latter generating an alternating voltage that follows this predetermined waveform w with the corresponding frequency. A primary voltage present on the primary inverter 18 is then, correspondingly transformed, fed to the primary winding 10.

By altering the frequency of the waveform w the frequency of the alternating voltage generated in the primary inverter 18 can be adjusted to the resonance frequency of the transformer 4. This requires registration of the efficiency of transmission of the electrical power to the secondary element 8 so that subsequently an operating point with an optimum efficiency can be determined. This could be achieved in that the voltage present at an output of the secondary element 8 and the current flow generated by consumers are registered by means of a secondary control unit 22 by way of a secondary measuring device 24.

In order to find a particularly effective operating point it would then be possible to operate the primary inverter 18 from a predetermined minimum alternating-voltage frequency to a predetermined maximum alternating-voltage frequency so that in any case the resonance frequency of the transformer 4, which resonance frequency is theoretically known at least roughly, is passed through.

By gradually increasing the frequency in the primary inverter 18, gradually, by way of the secondary control unit 22 and the secondary measuring device 24, voltage values and current values can be determined, wherein in this process, depending on the present frequency of the primary voltage a voltage gradient and current gradient is present, which gradients are registered on the secondary side, from which gradients the maximum value and the associated frequency can be selected.

In order to compile an analysis of a determined state point with measured voltage values and current values as well of the frequency of the primary voltage it is necessary to have information relating to the actually-present frequency of the primary voltage. Suitable for this are, in particular, modulator-demodulator devices 26 for the transmission of data from a primary element 6 to a secondary element 8 or vice-versa by way of data lines d that extend from the primary element 6 to a primary control unit 28 or from the secondary element 8 to the secondary control unit 22. Thus in relation to each changed and currently present frequency of the primary voltage the primary control unit 28 could transmit a corresponding data packet to the secondary control unit 22 so that in that location a connection between the frequency and the transmitted voltage or the flowing current can be generated.

Preferably, the secondary element 8 is connected to a secondary inverter 30 which optionally can comprise an upstream rectifier and is thus in a position to provide to consumers a voltage with a defined frequency and as far as possible with a sine waveform. The variation of a frequency of the primary voltage can thus not result in a situation in which consumers need to be supplied with alternating voltages that are unsuitable for them.

The secondary control unit 22 could furthermore be designed, by way of the data connection by means of the modulator-demodulator devices 26, to transmit a frequency change signal to the primary control unit 28, wherein the latter causes the controllable frequency generator 20 to change a frequency of the waveform w.

At the same time it would be advantageous if the primary control unit 28 by way of a primary measuring device 25 acquires electrical state variables of the current supply of the primary element 6 and sends them by way of the data connection to the secondary control unit 22. As a result of this, from the direct comparison between the electrical state variables on the secondary side and on the primary side of the transformer 4, by determining any occurring loss an iteration method can be significantly improved.

Figure 2:
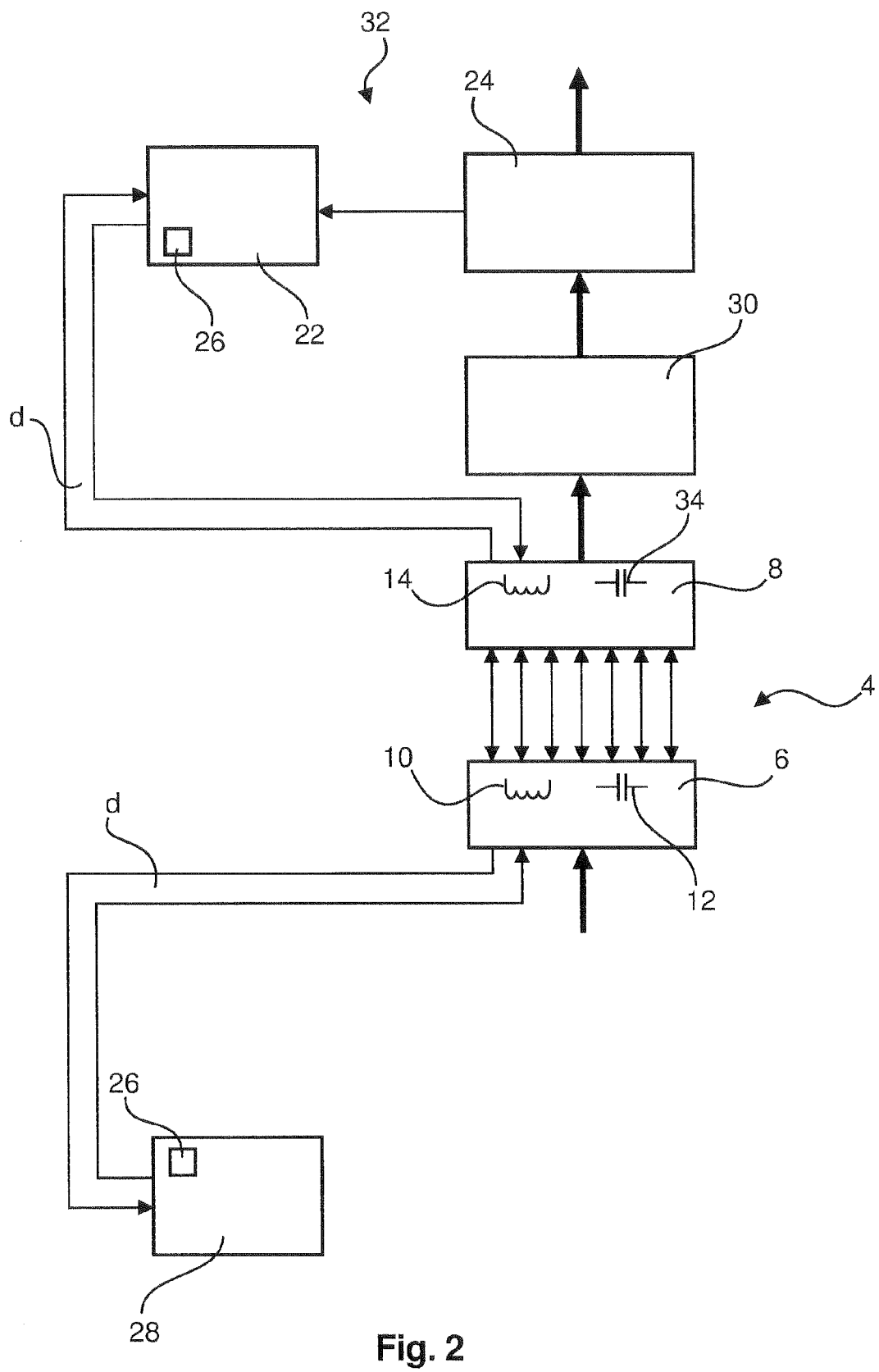
FIG. 2 shows a diagrammatic view of a system according to another embodiment of the invention.

FIG. 2 shows an alternative view in the form of a system 32 according to another embodiment of the invention, which system 32 follows a slightly different concept. In this embodiment it is not necessary to supply the transformer 4 with a variable alternating voltage from a primary inverter 18; instead, for all the primary elements 6 a shared primary voltage with a shared frequency is applied. Calibration of a system 32 can thus not be achieved by adjusting the primary voltage.

Instead, for the purpose of calibration the secondary element 8 is connected to a voltage-dependent secondary capacitor 34 that can be controlled by the secondary control unit 22. As a result of this, the resonance frequency of the transformer 4 can be influenced directly by the secondary control unit, and it is not necessary to change the frequency of the primary voltage.

After the system 32 according to an embodiment of the invention has been switched on, the secondary control unit 22 could cause the adjustable secondary capacitor 34 to vary by progressive increments from a theoretically predetermined minimum capacitance to a theoretically predetermined maximum capacitance, so that in this manner the resonance frequency of the transformer 4 is passed through from a theoretical maximum to a theoretical minimum. According to the principles of system 2, shown in FIG. 1, subsequently, by analyzing the state point determined on the secondary side, from the transmitted voltage in the secondary element 8 or from the transmitted electrical power the resonance frequency of the transformer 4 can iteratively be adjusted to the frequency of the primary voltage that is present. In the switch-on phase the secondary control unit 22 is supplied with voltage as soon as the secondary element 8 is arranged above a primary element 6 so that no external voltage supply connections are necessary for such calibration.

Despite it not being necessary to communicate measured state variables, data lines d between the primary control unit 28 and the primary element 6 as well as between the secondary control unit 22 and the secondary element 8 can be used for the exclusive supply of data to consumers.

Figure 3:
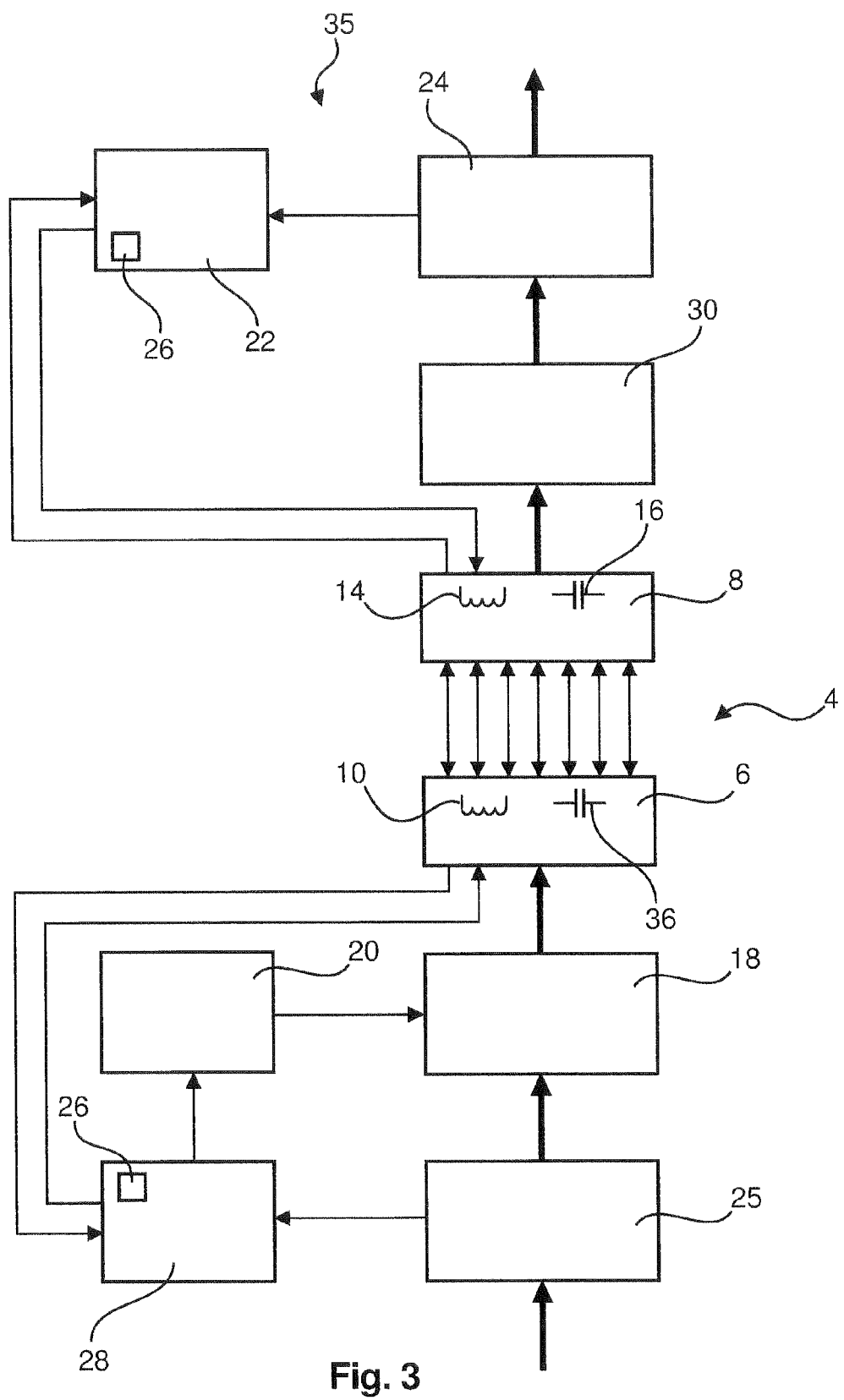
FIG. 3 shows a diagrammatic view of a system according to yet another embodiment of the invention.

Likewise, FIG. 3 shows another embodiment in which a primary element 6 comprises a voltage-dependent primary capacitor 36 that for adjusting a resonance frequency can be deployed from the primary side.

Figure 4:
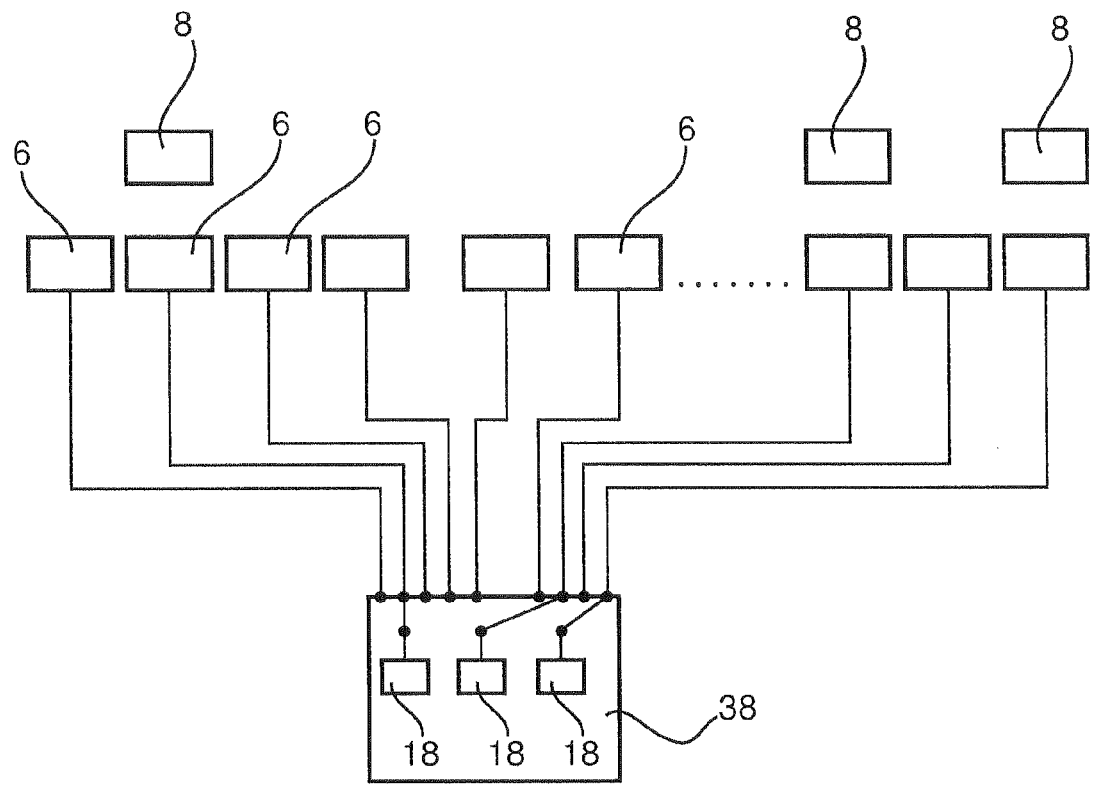
FIG. 4 shows a diagrammatic view of a partial aspect of the first embodiment.

FIG. 4 shows a system 2 according to an embodiment of the invention, which system comprises a plural number of primary inverters 18 that by way of a coupling device 38 can be coupled to a part of a multitude of primary elements 6. As a result of this it is not necessary for each primary element 6, for example in a cabin of a vehicle, to always be equipped with a primary inverter in order to carry out calibration.

The coupling device 38 is preferably able to detect the presence of mutually aligned primary elements 6 and secondary elements 8. This can take place in that any primary measuring devices 25 communicate their measured state variables to the coupling device 38, and in this way it is determined whether the current requirement of the primary element exceeds a normal loss current of the primary winding 10.

At the same time it would also be possible for the coupling device 38, by varying a primary voltage frequency and simultaneous measuring of state variables, to determine the primary voltage frequency at which there is resonance. By means of a conclusiveness test it is possible to determine whether the present resonance frequency corresponds to the resonance frequency of a transformer 4 or of a free primary winding 10 with a primary core without an adjacent secondary element 8.

Figure 5A:
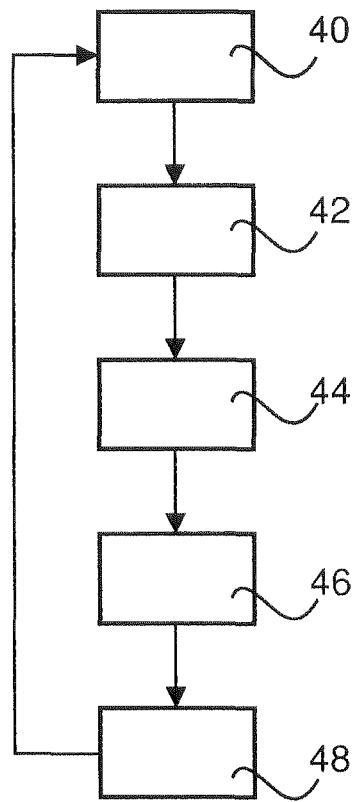
FIGS. 5a and 5b show two diagrammatic block-based views of methods according to an aspect of the invention.

FIG. 5a in an exemplary manner shows a possible method for calibrating a system for wireless energy transmission and data transmission.

At this point it should be emphasized that the method according to an aspect of the invention can be carried out until by iterative approximation an operating point has been reached with predetermined tolerance, at which operating point the electrical state variables in the secondary winding permit the conclusion that the highest-possible transmission of electrical power has been reached.

In a first step a primary voltage from a primary inverter is applied 40 to the primary winding 10. The aforesaid can have any frequency, for example at a lower limit or an upper limit of a predetermined frequency range. Consequently an electromagnetic field is generated which leads to the induction of a voltage in the secondary winding 14.

As a result of the subsequent acquisition 42 of electrical state variables in the secondary circuit by means of the secondary measuring device 24 a momentary state point is determined.

By analyzing 44 the momentary state point the secondary control unit 22 can determine whether the state point is already sufficiently optimal or whether further iteration is required. The process of analyzing can be carried out according to the fundamentals of commonly used iteration methods. Usually, by means of a predetermined first increment width relating to a frequency change in the primary voltage, a first state point can lead to a second state point, wherein these two state points in the case of the most frequently used iteration processes should be adequate for generating a third state point and any further state points and from this to converge to the optimum operating point.

Subsequently, by way of the secondary control unit 22, a signal is transmitted 46 to the primary control unit 28, which is connected in a controlling manner to the primary winding 10 and the primary inverter 18, in order to change the frequency of the applied primary voltage. The signal could, for example, contain a concrete value relating to a particular frequency of the primary voltage.

Upon receipt of this signal the primary control unit 28 changes 48 the frequency of the primary voltage in that the primary inverter 18, for example by correspondingly setting a frequency generator 20 that controls the primary inverter 18, changes the frequency of the primary voltage as desired. Subsequently, a changed electromagnetic alternating field is generated in the primary element 6, with the aforesaid resulting in an induced alternating voltage in the secondary winding 14 with different characteristics, as well as in measuring different electrical state variables.

In this arrangement the electrical state variables could, for example, relate to the level of the induced voltage in the secondary winding 14, as well as comprising the current intensity resulting from a connected consumer. If a real consumer is not permanently connected to the secondary winding 14, for the purpose of calibration a blind consumer, for example an ohmic resistor, could be used. From the product of current intensity and voltage the transmitted electrical power results as a parameter accessible for directly comparing various state points. An optimum operating point could be present at the highest value relating to the transmitted electrical power.

Preferably, the method according to an aspect of the invention is always carried out when the system according to an embodiment of the invention is switched on. In this manner it can always be ensured that optimum electrical power transmission is carried out, even in the case of progressive component ageing or the like.

Figure 5B:
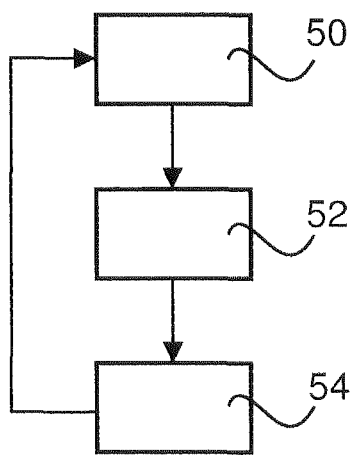

FIG. 5b as an alternative to this uses a constant frequency of the primary voltage so that on the secondary winding 14 the electrical state variables are determined 50, and the resonance frequency of the transformer 4 is changed, step-by-step, by changing 52 a capacitance of a secondary capacitor 34 that is connected to the secondary winding 14. This makes it possible to pass through different resonance frequencies of the transformer 4 and to determine the electrical power that can be transmitted at the respective resonance frequency. In this exemplary embodiment, too, by analyzing 54 the determined state point, the secondary control unit 22 can determine whether the state point is already sufficiently optimal or whether iteration is necessary as is the case in the procedure mentioned above.

Figure 6:
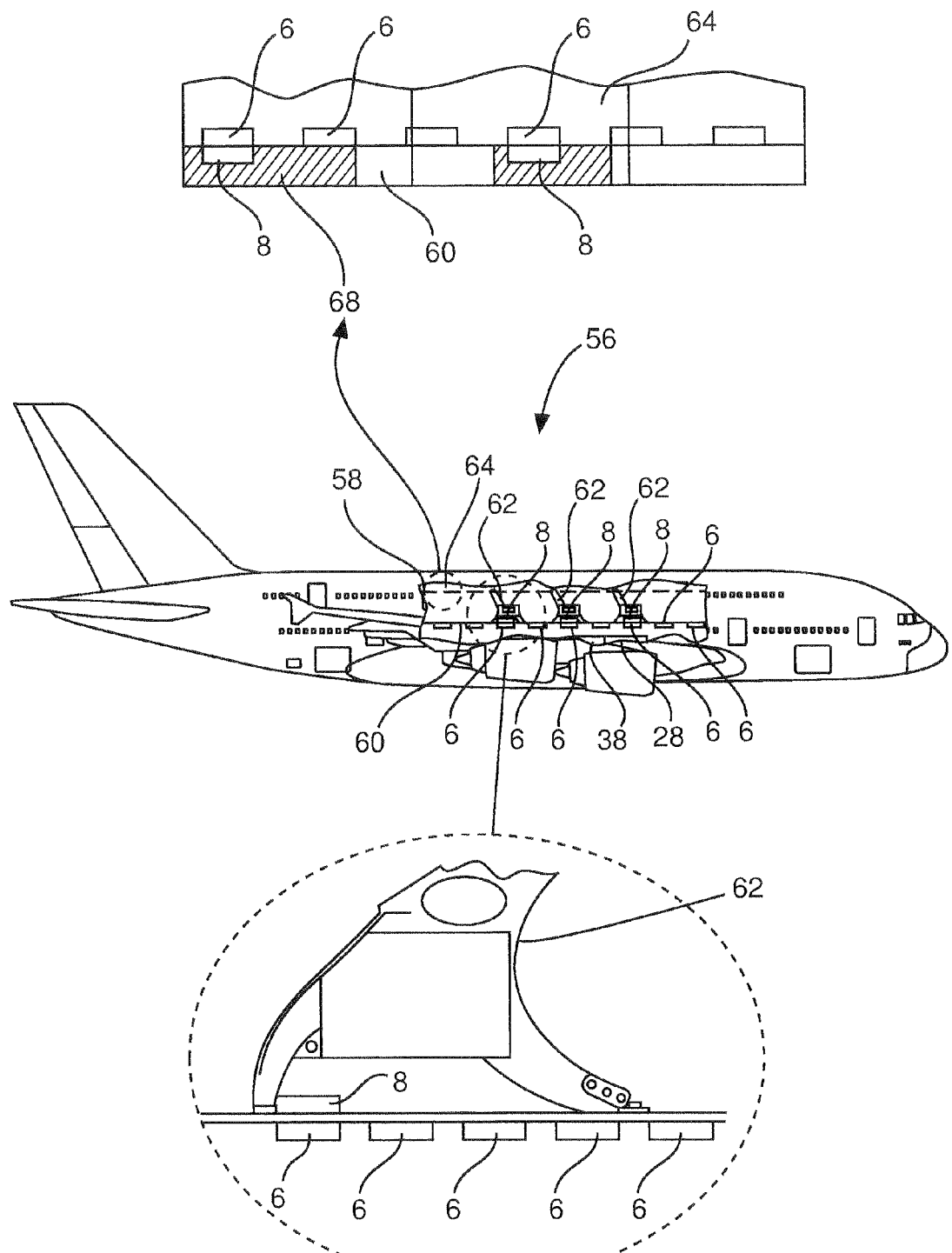
FIG. 6 shows an aircraft comprising a system according to an embodiment of the invention.

FIG. 6 finally shows a lateral partial section of an aircraft 56 that comprises a cabin 58 with several primary elements 6. Solely as an example, a floor 60 of the cabin 58 comprises primary elements 6, which are preferably arranged so as to be equidistant from each other, with a primary winding 10 and a primary core, with the aforesaid being connected to one or several primary control units 28. It is particularly preferable that primary elements 6 are connected in groups, as diagrammatically shown in FIG. 4, to a shared primary control unit 28 and/or by way of a coupling device 38 to a primary inverter 18, because, for example, several primary elements 6 in direct sequence could only be covered by a single secondary element 8, and only that primary element 6 needs to be controlled that in each case is spatially closest.

Secondary elements 8 with a secondary winding 14 and a secondary core could, for example, be situated in passenger seats 62 that are variably positionable along the floor 60. Because of their spatial extension in longitudinal direction of the cabin 58, the individual passenger seats 62 cover a whole series of primary elements 8 so that this could determine the sizes of possible interconnection groups.

Furthermore, in the cabin 58 a panel is indicated as an example, which panel is not only situated on the sides but also on the ceiling and comprises overhead bins 64 in a longitudinal extension. In this embodiment duct-like receiving devices could be provided into which the PSUs 68 can be inserted, which PSUs 68 in each case comprise a secondary element 8 that can in each case be made to link up with a primary element 6 in the duct-like receiving device. Here, too, the longitudinal extension of the individual PSUs 68 could determine the number of primary elements 6 which together can be linked to a primary control unit 28.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

2 System according to the invention
4 Transformer
6 Primary element
8 Secondary element
10 Primary winding
12 Primary capacitor
14 Secondary winding
16 Secondary capacitor
18 Primary inverter
20 Frequency generator
22 Secondary control unit
24 Secondary measuring device
25 Primary measuring device
26 Modulator-demodulator device
28 Primary control unit
30 Voltage transformer
32 System according to the invention
34 Voltage-dependent secondary capacitor
36 Voltage-dependent primary capacitor
38 Coupling device
40 Applying a primary voltage
42 Acquiring a state point
44 Analyzing the state point
46 Transmitting to primary control unit
48 Changing the frequency of the primary voltage
50 Determining electrical state variables
52 Changing the resonance frequency
54 Analyzing the state point
56 Aircraft
58 Cabin
60 Floor
62 Seat
64 Hatrack
68 PSU

The invention claimed is:

1. A system for contactless energy transmission, comprising:
 a resonant transformer with a primary winding in a primary core, a secondary winding in a secondary core mechanically not connected to the primary core, and at least one capacitor,
 a primary control unit, a secondary control unit,
a measuring device connected to the secondary winding and to the secondary control unit for acquiring an electrical state variable in the secondary winding,
a primary inverter, connected to the primary winding, with variable frequency, and
a modulator-demodulator device for transmitting data between the primary control unit and the secondary control unit by way of the transformer,
wherein the primary control unit is connected in a controlling manner to the primary inverter, and the primary control unit is configured to change the frequency of the primary inverter when the primary control unit receives a frequency change signal, and
the secondary control unit is configured, depending on the change in the electrical state variable, to transmit a signal for a frequency change in the primary inverter to the primary control unit such that a frequency of a primary voltage present at the primary winding corresponds to a resonance frequency of the resonant transformer during power transmission,
wherein the system further comprises a coupling device configured to individually connect one of a plurality of primary inverters selectively to one of a group of primary windings.

2. The system of claim 1, wherein the primary inverter comprises a frequency generator and is configured to generate an alternating voltage with a waveform following a waveform generated by the frequency generator.

3. The system of claim 1,
wherein the primary control unit is connectable in a controllable manner to the plurality of primary inverters.

4. The system of claim 3, wherein the coupling device is configured to subject all the available primary windings over a predetermined duration to an alternating voltage and to measure the resulting current intensity in the respective primary windings.

5. The system of claim 1, further comprising a primary measuring device for determining an electrical state variable present at the primary winding.

6. The system of claim 1, further comprising a secondary inverter connected to the secondary winding and configured to provide a voltage of a predetermined frequency to electrical consumers.

7. The system of claim 1, further comprising a primary rectifier arranged upstream of the primary inverter.

8. The system of claim 7, further comprising a primary measuring device for determining an electrical state variable present at the primary winding, wherein the primary measuring device is connected to the primary rectifier.

9. The system of claim 7, wherein the primary control unit is configured to transmit the value of the determined electrical state variable to the secondary control unit.

10. A vehicle, comprising a system for wireless energy transmission, the system comprising:
a resonant transformer with a primary winding in a primary core, a secondary winding in a secondary core mechanically not connected to the primary core, and at least one capacitor,
a primary control unit,
a secondary control unit,
a measuring device connected to the secondary winding and to the secondary control unit for acquiring an electrical state variable in the secondary winding,
a primary inverter, connected to the primary winding, with variable frequency, and
a modulator-demodulator device for transmitting data between the primary control unit and the secondary control unit by way of the transformer,
wherein the primary control unit is connected in a controlling manner to the primary inverter, and the primary control unit is configured to change the frequency of the primary inverter when the primary control unit receives a frequency change signal, and
the secondary control unit is configured, depending on the change in the electrical state variable, to transmit a signal for a frequency change in the primary inverter to the primary control unit,
wherein the system further comprises a coupling device configured to individually connect one of a plurality of primary inverters selectively to one of a group of primary windings.

11. The vehicle of claim 10, comprising a first vehicle component affixed to the vehicle, and a second vehicle component movable relative to the first vehicle component, wherein the first vehicle component comprises at least one primary element, and the second vehicle component comprises a secondary element.

12. The vehicle of claim 10, wherein the first vehicle component is a floor, and the second vehicle component is a passenger seat.

13. The vehicle of claim 10, wherein the first vehicle component is a cladding element, and the second vehicle component is a PSU.

\* \* \* \* \*